United States Patent [19]

Fulmer

[11] 4,254,177

[45] Mar. 3, 1981

[54] FIRE-RETARDANT PRODUCT AND METHOD OF MAKING

[75] Inventor: Glenn E. Fulmer, Clarksville, Md.

[73] Assignee: W. R. Grace & Co., New York, N.Y.

[21] Appl. No.: 36,955

[22] Filed: May 7, 1979

[51] Int. Cl.$^3$ .............................. B32B 5/20; B32B 7/04
[52] U.S. Cl. ........................................ 428/256; 5/459; 5/481; 428/310; 428/314; 428/315; 428/921
[58] Field of Search ............... 428/310, 314, 315, 425, 428/920, 921, 137, 139, 140, 255, 256; 5/459, 481

[56] References Cited

U.S. PATENT DOCUMENTS

| 3,051,601 | 8/1962 | Schick | 428/213 |
|---|---|---|---|
| 3,861,993 | 1/1975 | Guthrie | 428/315 |
| 3,897,372 | 7/1975 | Kehr et al. | |
| 3,951,718 | 4/1976 | Gonzalez | 428/310 |
| 4,066,578 | 1/1978 | Murch et al. | |
| 4,092,752 | 6/1978 | Dougan | 5/459 |
| 4,105,594 | 8/1978 | Dieterich et al. | |
| 4,110,508 | 8/1978 | Isgur et al. | 428/315 |
| 4,116,735 | 9/1978 | Plasse | 5/481 |
| 4,137,200 | 1/1979 | Wood et al. | |
| 4,181,770 | 1/1980 | Schumacher et al. | 428/310 |

FOREIGN PATENT DOCUMENTS 992301  7/1976  Canada .

Primary Examiner—William J. Van Balen
Attorney, Agent, or Firm—Edward J. Cabic

[57] ABSTRACT

Articles having increased fire-retardant properties are obtained by surrounding a foraminous core having the desired product properties with an adherent protective layer of a hydrophilic polyurethane foam having large amounts of fire-retardant fillers. The core can be made of rigid, semi-rigid or flexible foams. Preferable cores include conventional bedding and cushioning materials. The protective layer can be sprayed or poured as a coating or molded on to the core.

18 Claims, No Drawings

FIRE-RETARDANT PRODUCT AND METHOD OF MAKING

REFERENCE TO RELATED APPLICATIONS

Commonly assigned U.S. patent application Ser. No. 950,038, filed Oct. 10, 1978, which is a continuation-in-part application of Ser. No. 795,216, filed May 9, 1977, now abandoned, discloses polyurethane foams which are used according to the present invention.

Commonly assigned U.S. patent application Ser. No. 956,813, filed Nov. 2, 1978, discloses applying to mine surfaces as a sealant the polyurethane foam coatings used according to the present invention.

BACKGROUND OF THE INVENTION 1. Field of the Invention

The present invention relates to fire-retarding articles made of a foraminous core and having a protective fire-retarding layer on the outside made of a hydrophilic polymer foam. Coating and molding methods are disclosed to provide the fire-retardant protective layer around the core.

2. Description of the Prior Art

Many different types of articles are made of foraminous materials. Flexible urethane foams, for example, have many useful advantages such as good cushioning properties, acoustical and thermal insulation, ease of processing, low cost and light weight. They are being widely used in cushioning materials in automobiles, rolling stocks, airplanes, chairs, sofas and mattresses. These conventional flexible polyurethane foams, however, present serious fire hazards. Attempts have been made to produce flame-retardant urethane foams by the use of flame-retarding raw materials or by after-treatment of the foam products. Although some of these materials can pass a cigarette burn test which has a mild ignition source, it is difficult to add a large amount of fire-retardant materials in the foam, and thus many of these foams are not effective under more severe ignition sources or burning conditions. In addition many of the fire-retardant chemicals required in these foams are expensive in nature, which in turn contributes to the high cost of the foam article.

Attempts have been made to provide a separate barrier layer for fire resistance when using polyurethane foams. One example, made by the Kimberly-Clark Corporation under the trademark KIMBAR, is a nonwoven sheet made of wet-laid novoloid fibers, alone or in combination with a flame-retardant resin binder. Another barrier material, made by du Pont under the trademark VONAR, is an interliner of a carboxylated polychloroprene latex which is heavily loaded with chemical additives. This product is recommended to reduce the furniture burning rate for limited ignition situations such as in business and institutional furniture where there is a reduced likelihood of ignition to the upholstered furniture. If VONAR is ripped, cut or otherwise separated so as to expose the flammable cushioning material beneath it, the degree of protection provided by VONAR is reduced. Thus, this material is not recommended in areas where the cushions are susceptible to vandalism and intentional fire.

Another approach to provide a flame-retardant foam article is to fabricate the article out of a hydrophilic polyurethane foam containing substantial amounts of fire-retardant additives. U.S. Pat. No. 4,137,200 to Wood et al discloses a suitable foam and U.S. Pat. Nos. 3,897,372 to Kehr et al. and 4,066,578 to Murch et al disclose foams with various fire-retardant additives. Although these foams have good fire-retardant properties, they do not necessarily possess optimum properties with regard to resiliency and flexibility desired for seat cushion use.

In addition to the use of flexible foams, other foraminous materials such as semi-rigid or rigid foams also perform useful functions such as providing for impact absorption, thermal insulation and the like. Such articles may also present serious fire hazards.

3. Objects of the Invention

It is an object of this invention to provide a protective layer on a foraminous core structure so as to reduce the burning tendencies of the resulting product.

It is another object of this invention to provide a flexible product made of a foam core material with a protective fire-retardant outer layer in which the resulting product has good flexibility and cushioning properties while providing good fire-retardant properties.

It is another object of this invention to employ a conventional bedding or cushioning material such as an innerspring construction or cotton linters and to provide an adherent fire-retardant protective outer layer in which the resulting product has good flexibility and cushioning properties while providing good fire-retardant properties.

It is a further object of this invention to provide a coating to a foam material which adheres well to the substrate and which is made of a hydrophilic polyurethane foam containing large amounts of fire-retardant additives.

It is a further object to provide a protective foam layer by a fabrication method in which the outside foam protective layer is initially formed on the inner surface of the mold, and then the core foam is added to fill the space inside the protective layer.

These and other objects of the invention will become apparent as the description of this invention proceeds.

SUMMARY OF THE INVENTION

Fire-retardant articles can be produced by covering conventional foraminous cores with an adherent protective layer made of a fire-resistant hydrophilic polyurethane coating. This hydrophilic polyurethane coating contains a large amount of fire-retardant additives which provide the fire-retardant property for the foam. The coating foam layer can be selected to be either flexible, rigid or semi-rigid depending on the protective coating properties desired. In addition, when a polymeric foam is used as the core material, and especially when a polyurethane foam is used, there will be good adhesion between the outer protective layer and the iner foam core.

The cores can be made of rigid, semi-rigid and flexible foams. A preferred group of products are those made of flexible foams. In addition to flexible foams used as the core, other conventional bedding and cushioning material having the desired flexibility and resiliency can also be used for the core since the fire-retardant foam is able to form an adhering protective layer. Examples of the nonfoam types of cores include innerspring construction and cotton linters.

The invention also relates to methods of applying this protective layer to the core. One way to apply the protective layer is to spray a mixture of a hydrophilic polyurethane prepolymer and water containing a large amount of the fire-retardant additives. After the water slurry and prepolymer have been mixed together, the mixture can be applied from a spray gun where the coating obtained forms a polyurethane foam protective layer.

Another method of applying the protective layer is in a mold. In one example the bottom and side portions of the mold can be coated with a mixture of the polyurethane foam forming materials. As the foam begins to form, the article to be protected is inserted into the mold. Then an additional protective layer of foam forming materials can be applied over the top. After closing the mold, a protective foam layer forms uniformly around the core.

Another technique to form the coated core product can be used when the core is a foam type material capable of being formed in situ. This method involves first spraying a mixture of the prepolymer and aqueous fire-retardant slurry into a hollow mold. The coating forms a foam as an inner layer around the mold. Then into the remaining hollow space inside the mold a second foam material is sprayed or poured to form the core material. Again a preferred core material is a polyurethane foam.

DETAILED DESCRIPTION OF THE INVENTION

In the practice of this invention, the outer protective hydrophilic polyurethane foam layer with a high loading of additives provides the fire-resistant properties to the core article. Thus, in making the final product, many different materials can be used as the core material since the fire-retardant property is achieved by the protective layer. This layer can be applied around conventional innerspring constructions as well as cotton linters.

If the protective polyurethane foam layer does not sufficiently adhere to these nonfoam core materials, then an adhesive layer such as an adhesive latex can initially be applied to the core materials.

The foraminous core foams can be rigid, semi-rigid or flexible. Examples of conventional core foams that can be used include epoxy, isocyanurate, phenolic, silicone, urea formaldehyde, polystyrene, olefin, polyvinylchloride, acetal, ABS, nylon, polycarbonate, polyester and phenylene oxide.

For many of these core foams the protective polyurethane foam layer will adhere very well due to the adhesive nature of the polyurethane and due to the mechanical locking that occurs when the polyurethane flows into the open cell structure on the surface of the core foam. If a sufficient adhesion is not obtained, then the core foam can initially be coated with an adhesive layer such as by applying an adhesive latex.

To achieve products which serve as good cushioning or bedding materials, it is preferred to use a flexible polyurethane foam as the core. Again, any type of flexible polyurethane foam can be used, with the selection being based on foam properties such as the modulus (a measure of flexibility), tensile strength, tear strength, compression set, resilience, density, cost and elongation. Flexible polyurethane foams are widely available and are produced in slab form by such manufacturers as E. R. Carpenter Co. (Richmond, Va.), Tenneco Chemicals (Paramus, N.J.), Reeves Brothers (Cornelius, N.C.), United Foam Corp. (Compton, Cal.) and Firestone (Providence, R.I.).

The protective layer is made of a hydrophilic polyurethane such as the type disclosed in U.S. Pat. No. 4,137,200 to Wood et al. These hydrophilic polyurethane foams have the ability to hold large amounts of additives. The foams are made by reacting isocyanate capped hydrophilic prepolymers with large amounts of water. Since this polymeric foam also contains urea groups which are formed during the foam forming reaction, the polymer may also be referred to as a polyurea polyurethane. The additives are incorporated into the water as a slurry during foam formation process. For example, foams can be made using 100 parts of prepolymer to a slurry containing about 100 parts of water.

The preferred fire-resisting foam to be deposited is the multi-component polyurethane foam described in commonly assigned U.S. patent application Ser. No. 950,038, filed Oct. 10, 1978, which is incorporated herein by reference.

There, polyurethane foams are disclosed with the desired fire-resistant additives. The polyether polyurethane prepolymers employed are hydrophilic, i.e., usually at least 40 mole percent of the oxyalkylene units in the prepolymer backbone are oxyethylene units, with the balance being oxypropylene, oxybutylene or other oxalkylene units. In the resulting polyurethane foams, the branch-points of the polymer chains are connected by essentially linear polyoxyalkylene chains containing at least 40 mole percent of oxyethylene units (excluding initiators at branch-points) as described above. Where the oxyethylene content is from about 60 to 75 mole percent, it may be desirable to use a surfactant to be discussed below to promote dispersion of the prepolymer in water prior to foaming.

The foams are based on the prepolymer technique. Suitable prepolymers are prepared by capping a polyoxyalkylene polyol with an excess of polyisocyanate, e.g., toluene diisocyanate. Prior to capping, the polyol preferably has a molecular weight of from about 200 to about 20,000 and more preferably from about 600 to about 6,000. The hydroxy functionality of the polyol and the corresponding isocyanate functionality following capping is from about 2 upwards, usually not exceeding about 8. If foams are formed from prepolymers with an isocyanate functionality of about 2, the resulting foam is essentially linear and does not have as much tensile strength as crosslinked foams. Accordingly, if the isocyanate functionality is about 2, a crosslinker can be employed, although the linear non-crosslinked foams are operable in the present invention. Suitable crosslinkers are well known in the polyurethane art and include by way of example, 2,4,6-triaminotoluene, ethylene diamine, diethanolamine, diethylenetriamine, triethylene-tetramine, tetraethylenepentamine, and ethanolamine.

Examples of suitable polyols, isocyanates and initiators are listed in the referenced patent application. Useful polyols include linear branched polyfunctional polyols together with an initiator or crosslinker. One preferred prepolymer is a mixture of a polyoxyethylene glycol and a polyhydric alcohol containing 3 or 4 hydroxyl groups per molecule. A specific example is a mixture of polyethylene glycol (m.w. about 1,000) with trimethylolpropane, trimethylolethane or glycerine. This mixture can be subsequently reacted with excess polyisocyanate to provide the prepolymer. Alternatively, the linear or branched polyols, (e.g., polyethylene glycol) can be reacted separately with excess polyisocyanate. The initiator, e.g., trimethylolpropane, can also be separately reacted with polyisocyanate. Subsequently, the two capped materials can be combined to form the prepolymer.

Suitable polyisocyanates useful in preparing prepolymers include toluene-2,4-diisocyanate, toluene-2,6-diisocyanate, commercial mixtures of toluene-2,4- and 2,6-diisocyanates, and additional diisocyanates and triisocyanates listed in the referenced patent application.

In obtaining prepolymers described in the referenced patent application, excess toluene diisocyanate (TDI) can be added to insure adequate curing of the foam and to reduce the density of the foam. Since toluene diisocyanate is toxic and has a low vapor pressure, it is preferred in some applications not to use excess TDI. Instead, another diisocyanate type material having a lower vapor pressure is added to provide the desired excess diisocyanate. One example of such a substitute material is Isonate 143L made by Upjohn Polymer Chemical Co. This is a modified diphenylmethane diisocyanate containing a high percentage of pure diphenylmethane diisocyanate and a lesser amount of polycarbodiimide adducts. Another example is PAPI 135, a polyarylpolyisocyanate made by Upjohn.

Various types of fire-retardants and/or intumescent materials can be incorporated into the protective foam. Most of the materials are first suspended or dissolved in the aqueous phase to form the slurry or solution and then the prepolymer is mixed with the slurry. The amount of materials to be added to the water can vary from about 10 parts of material per 100 parts of water up to about 300 parts of material per 100 parts of water. If concentrations are employed below the lower amount, there may not be enough fire-retardant or intumescent material present in the resulting foam. On the other hand, if more material is added to the water than the upper specified amount, then a thick paste will form which will not mix well with the prepolymer. This discussion on the amount of additives is based on materials having a relatively low density such as a specific gravity of around 3, as possessed by alumina trihydrate. Of course, if much heavier particles are employed, such as lead, having a specific gravity of 11.3, then larger amounts by weight could be added to the aqueous slurry before a limiting thick paste is obtained. Some of the materials, such as the phosphates to be discussed below, can initially be mixed with the prepolymer instead of being added to the aqueous slurry or solution.

Broad classes of preferred materials include alumina trihydrate, $Al(OH)_3$; polyammonium phosphates; borates; borate derivatives of sugar, starch or cellulose, wood pulp, halogen containing materials, heavy metals; etc. H. Z. Vandersall describes many materials used in intumescent paint chemistry in *Journal of Fire and Flammability*, 2, 87(1971). Vandersall lists four categories for classifying components of intumescent systems as (1) an inorganic acid or a material yielding acid at temperatures between 100 and 250° C., (2) a polyhydric material rich in carbon, (3) an organic amine or amide, and (4) a halogenated material. Most formulations contain an example of each although, in some cases, two or more functional groupings are included in a single component.

Inorganic acid sources include acids such as phosphoric, sulfuric and boric; ammonium salts such as ammonium phosphate, ammonium monophosphate, ammonium diphosphate, ammonium polyphosphate, ammonium sulfate and ammonium halides; amine and amide phosphates such as urea phosphate, guanyl urea phosphate, melamine phosphate, polyphosphorylamide, phosphoryl trianilide, and reaction products of $NH_3$ and $P_4O_{10}$; amine sulfates such as p-nitroaniline bisulfate; and organophosphorous compounds such as tricresyl phosphate, alkyl phosphates; and haloalkyl phosphates such as tris(2,3 dibromopropyl)phosphate and tris($\beta$-chloroethyl)phosphate.

Polyhydric materials include starch; dextrin; sorbitol; pentaerythritol and its dimers and trimers; resorcinol; phenolics; triethylene glycol; methylol melamine; isano oil; and linseed oil.

Amine and amide compounds include urea, urea:HCHO, butyl urea, dicyandiamide, benzene sulfonylhydrazide, melamine, aminoacetic acid such as glycine, casein, polyamide resins and wool flock.

Halogenated compounds include chlorinated paraffins, chlorinated rubber, parachlorometaxylenol, tetrachlorophthalic resins and pentachlorophenyl glyceryl ether.

From about 50 to about 400 parts of alumina trihydrate are employed, and preferably from about 100 to about 275 parts per 100 parts of water. In the case where 100 parts of polyurethane prepolymer are mixed with 100 parts of the water, then the amount of alumina trihydrate employed is from about 50 to about 400 parts per 100 parts by weight of the polyurethane. Satisfactory alumina trihydrate (also called hydrated alumina or alumina hydrate) is highly refined, inorganic white granular crystalline powder with the $Al_2O_3.3 H_2O$, chemical formula of which is also frequently written as $Al(OH)_3$. Such material is produced by the Bayer process from bauxite ore and may contain small amounts of soda, iron oxide and silica. Suitable alumina trihydrates as described above are chemically inert and frequently are employed as inert fillers. Generally, the alumina trihydrate is employed in particulate form with an average particle size of from about 0.5 to about 120 microns. Particles of about 5 to about 20 microns are particularly useful.

The phosphorous-containing additive is employed at levels of from about 1 to about 40 parts by weight per 100 parts of water, and preferably at about 5 to about 20 parts. Suitable phosphorous-containing compounds include phosphites, polyphosphites, ammonium phosphates such as Phoschek P/30 made by Monsanto, polyphosphates, phosphate salts, organic phosphates, phosphonates and polyphosphonates and mixtures thereof. Additional phosphorous compounds are more fully described in U.S. Pat. No. 4,066,578, incorporated herein by reference.

The carbon compound employed must have an OH/C mole ratio of at least 0.1:1 and preferably from about 0.3:1 to about 0.8:1. The carbon compound must also be water-dispersible to the extent that it is either soluble or miscible with water, or it can be dispersed in water with the aid of common surfactants so that the foam can be uniformly protected. In general, the total amount of the carbon compound employed should react at least about 5 parts by weight to provide any benefit. However, if the amount of the carbon compound employed is too great, the flame-retardant contribution of the alumina/phosphorous compounds will be overcome. Therefore, the upper limit on the amount of carbon compound employed is about 30 parts by weight. Preferably from about 10 to about 25 parts are employed. When using wood cellulose a lower amount can be employed from about 2 to 10 parts with a preferred range of 4 to 5 parts.

Suitable carbon compounds include aliphatic alcohols having at least two hydroxyl groups per mole, and also include "aromatic" alcohols, i.e., phenols. Suitable aliphatic alcohols may be exemplified as follows: pentaerythritol, (mono-, di-, tripentaerythritol), methylene glycol, glycerine, polyvinyl alcohol, trimethylolpropane, erythritol, arabitol, triethanol amine and methylol melamine. Suitable saccharides include: starch, sorbitol, dextrin, flour, cellulose (including wood cellulose and its ground form, known as wood flour), extracted Douglas Fir bark, mannitol, sucrose, inositol and arabinose. Suitable phelols, (i.e., aromatic hydroxyl compounds) include: resorcinol, lignin, hydroquinol, trimethylolbenzene, phyrogllol, catechol and phloroglucinol. If undue thickening action occurs in the aqueous phase through use of any of the above carbon compounds, the amount of the compound employed should be reduced to permit adequate processing.

Suitable carbon compounds include aliphatic alcohols having at least two hydroxyl groups per mole, and also include "aromatic" alcohols, i.e., phenols. Suitable aliphatic alcohols may be exemplified as follows: pentaerythritol, (mono-, di-, tripentaerythritol), methylene glycol, glycerine, polyvinyl alcohol, trimethylolpropane, erythritol, arabitol, triethanol amine and methylol melamine. Suitable saccharides include: starch, sorbitol, dextrin, flour, cellulose (including wood cellulose and its ground form, known as wood flour), mannitol, sucrose, inositol and arabinose. Suitable phenols, (i.e., aromatic hydroxyl compounds) include: resorcinol, lignin, hydroquinol, trimethylolbenzene, pyrogallol, catechol and phloroglucinol. If undue thickening action occurs in the aqueous phase through use of any of the above carbon compounds, the amount of the compound employed should be reduced to permit adequate processing.

In the present specification, and especially in the following description of the various components employed in the foams, reference to "parts" or "parts by weight" refers to parts by weight based on 100 parts by weight of the urethane prepolymer employed. The terms fire-retardant additives or fire-retardant fillers as used here and in the claims are to encompass also the intumescent materials discussed above.

Preparation of a protective coating foam according to one embodiment of the invention is illustrated in the example. Preferably this embodiment starts by dissolving or dispersing the phosphorous compound in the urethane prepolymer, although the phosphorous compound can be added to the water phase. The alumina hydrate and the carbon compound are dispersed in water. Subsequently the two phases are combined as a reactant mixture which is sprayed to produce the foam. As described in U.S. Pat. No. 4,066,578 referred to above, a suspending agent for the alumina trihydrate is generally included in the aqueous phase. The use of such a surfactant is optional. A surfactant can also be included in the organic phase. The suspending agent for the alumina trihydrate is generally a non-ionic surfactant, whereas any surfactant included in the organic or aqueous phases to influence cell size or structure is a non-ionic, cationic or amphoteric surfactant. The surfactant should not be anionic. From about 0.1 to about 2 parts of the non-ionic suspending agent are employed, and from about 0.01 to about 2 parts of the non-ionic, cationic or amphoteric surfactant are employed.

Suitable non-ionic surfactants/suspending agents, often described as solution thickeners, include but are not limited to non-ionic cellulosic polymers such as hydroxyethyl cellulose polymers (e.g., Natrosol, such as Natrosol 250HH, by Hercules, or Cellosize by Union Carbide), hydroxypropyl cellulose (e.g., Klucel by Hercules), ethylhydroxyethyl cellulose (e.g., EHEC by Hercules), and ethyl cellulose. In addition to non-ionic cellulosic polymers, other appropriate non-ionic suspending agents include water-soluble polyoxyethylene polymers (e.g., Polyox by Union Carbide), gelatin, guar gum and agar.

These suspending agents or solution thickeners are optional ingredients since the foam-forming materials could be initially formulated just prior to spraying. However, when the aqueous slurry is made in bulk and is being used over a period of days, then it is advantageous to add the suspending agent to maintain the large concentration of additives in suspension.

Examples of suitable amphoteric and cationic surfactants are set forth in U.S. Pat. No. 4,066,578, which has been incorporated by reference into the present application. Suitable non-ionic surfactants include sorbitan trioleate (e.g., Arlacel 85 by ICI), polyoxyethylene sorbitol oleate (e.g., Atlas G 1186 by ICI), polyoxyethylene sorbitan monolaurate (e.g., Tween 21 by ICI), polyoxyethylene lauryl ether (e.g., Brij 30 by ICI), polyoxyethylene stearyl ether (e.g., Brij 72 by ICI), silicon glycol copolymer (DOW Corning 190), fluorochemical surfactants (e.g., Zonyl FSN by E. I. du Pont and Fluorad FC 170C by 3M,) condensates of ethylene oxide and propylene oxide with propylene glycol (e.g., Pluronic L62, Pluronic L64, Pluronic P75 by BASF Wyandotte), and organosilicone surfactants (e.g., L520 by Union Carbide).

In addition, reinforcing agents can also be added to the mixture to improve the strength of the resulting foam. Many types of fibers can be used for this purpose, such as wood, carbon, glass, polyolefin, polyester, polyamide, cellulosic (which would include rayon), polyvinyl alcohol, polyvinyl chloride, and polyvinylidene chloride fibers; mineral wool; metal fibers; etc.

The fire-retardant polyurethane foams prepared by the invention have numerous advantages. Specifically, it is believed the chars are stronger and more resistant to removal as described earlier. Additionally, many of the foams, while containing appreciable quantities of particulate and normally "dusty" additives, are relatively non-dusty, especially in comparison to foams loaded to similar levels but not utilizing the invention. Additionally, the carbon compound employed along with the alumina trihydrate and phosphorous compounds exhibit good resistance to leaching. Foams prepared according to the invention are generally open celled and may be rigid, semi-rigid or flexible, depending upon the level of crosslinker and amounts of additives employed. Techniques for achieving various cell structures and the various degrees of rigidity of polyurethane foams are well known and do not form part of the present invention.

The spraying of the foam reactant materials can be done with spray equipment using either high pressure airless spray or with lower pressures by use of an additional air blast. Since the prepolymer and the water will react to produce the foam soon after mixing, it will be necessary to use spray equipment in which these two materials are separated either until the time of spraying or just before the materials are sprayed from the spray gun applicator.

A Graco Airless spray gun manufactured by Graco Inc., Minneapolis, Minnesota has been used to give satisfactory coatings. This spray gun is characterized by having one supply tank in which the prepolymer is pressurized, and a second tank in which the water phase containing the alumina hydroxide and char forming carbon compound is also being pressurized. The two ingredients are eventually forced under substantial pressure of about 1500 to 3000 p.s.i. up into the gun where they pass through a Kenix motionless mixer and then pass out through the nozzle to be sprayed onto the substrate. Using the Graco Airless spray gun, a mixture is applied which expands to produce a foam coating of approximately one-fourth to one inch onto a substrate. The spray gun can be positioned approximately two to four feet from the substrate. Using the Graco device, a panel three feet by five feet can be coated in about two minutes.

The mixture can also be sprayed under considerably less pressure by separately pumping the aqueous phase and the prepolymer in metered amounts to a Kenix motionless mixer and then applying a blast of air such as at a pressure of about 50 to 100 p.s.i., to the mixture to spray or splatter the coating material to the substrate.

Other spraying devices can be used if they are capable of metering, mixing and spraying highly viscous materials and so long as they maintain the prepolymer and the water phase separate and apart until just before the foam coating is to be applied.

When using the Graco Airless spray gun, satisfactory foam coatings were obtained at a ratio of one part by volume of prepolymer to two parts by volume of the aqueous slurry. However, other volume proportions also produce successful coatings. For example, satisfactory coatings have been achieved using other spray equipment with 10 volume parts of aqueous slurry to one volume part of prepolymer.

The present hydrophilic polyurethane prepolymer is advantageous for forming the protective layer. Due to its hydrophilic nature, it can be easily mixed with excessive amounts of a water slurry carrying a large concentration of fire-retardant filler particles. When the prepolymer is added to the large amount of slurry, the prepolymer disperses and spreads out over the larger liquid volume and forms a foam which encompasses all of these fire-retardant particles. Although much of the water is removed upon drying, the particles are all retained in the resulting foam matrix structure.

After the foam reactants have been sprayed from the gun, the line through which the prepolymer has been applied can be flushed clean with a solvent such as methylene chloride, water, or water containing various additives such as detergents, etc.

TRADE NAMES USED IN THE EXAMPLES

Antiblaze 78—chloroethyl phosphonate oligomer, by Mobil
FC 170—fluorinated alkyl polyoxyethylene ethanols, by 3M
Isonate 143L—diphenylmethane diisocyanate with a small amount of polycarbodiimide adducts, by Upjohn
Natrosol 250HH—hydroxyethyl cellulose, by Hercules
Phoschek P/30—ammonium polyphosphate, by Monsanto
Pluronic L-62—condensate of ethylene oxide and propylene oxide with propylene glycol, by BASF Wyandotte
Proxcel CRL—microbiostat preservative with 1,2-benzisothiazolin-3-one as an active ingredient, by ICI

PREPARATION EXAMPLE 1

Prepolymer A is prepared by admixing two molar equivalents of polyoxyethylene diol, which is commonly known as polyethylene glycol, having an average molecular weight of 1,000 (PEG—1,000) and 0.67 molar equivalents of 2,2-dihydroxymethyl-1-butanol, which is commonly known as trimethylolpropane (TMOP). The admixture is dried at 100°–110° C. under a pressure of 5–15 Torr to remove water. The resulting dried mixture is slowly added over a period of about one hour to a vessel containing 5.7 molar equivalents of toluene diisocyanate (TDI) while stirring the TDI and polyol mixture. The temperature is maintained at 60° C. with stirring for three additional hours. All hydroxyl groups are capped with isocynate, and some chain extension occurred because of crosslinking of the polyols with TDI.

EXAMPLE 1

The substrate to be coated was a commercially available foam core having a density of 1.13 lb/ft$^3$, a cell size of 80 pores per inch, a modulus of about 108 and an Oxygen Index of 16.6. This Oxygen Index is determined by the Modification of ASTM D2863-74, described by Beatorewicz and Hughes, *Journal of Fire and Flammability*, 2, 259 (1971). The coating to be sprayed was formulated in two components. The first component was made of 100 parts of the prepolymer of Preparation Example 1, to which is added 9 parts of Antiblaze 78 and 16 parts of Isonate 143L. The second component consisted of an aqueous fire-retardant slurry having the following composition:

|  | Pts/weight |
| --- | --- |
| Water | 100.0 |
| Al(OH)$_3$* | 150.0 |
| Phoschek P/30 | 30.0 |
| Bohemia Douglas Fir Bark | 4.0 |
| Natrosol 250HH | 0.4 |
| FC 170C | 0.2 |
| Pluronic L-64 | 2.0 |
| Proxcel CLR | trace |

*Alcoa grade C331 having a particle size of about 6.5 to 9.5 microns.

The two components were pumped separately under a pressure of about 1500 to 2000 psi to a Graco Airless spray gun where they were mixed in a ratio of one volume of the prepolymer mixture to two volumes of the aqueous slurry. The resulting sprayed mixture foamed and set up into a foam that was approximately one inch thick over the core. The coating had a density of about 14.1 lb/ft$^3$, a cell size of 10–20 pores per inch, a modulus of about 237 and an Oxygen Index of 49.9. The foam coating adhered very well to the core. When attempts were made to pull the coating off by hand, the foam in the core pulled apart first.

BURN TEST 1

To demonstrate the increased fire retardance, the following burning test was conducted. This test, of course, is not intended to reflect hazards presented by this or any other material under actual fire conditions. First, as a control, the core foam material alone was covered with a fire-retardant type mattress ticking which passes the cigarette ignition test in DOC FF-72.

The sample was placed on cement blocks so that the edge of the sample was just over the edge of a polyethylene dishpan containing seven sheets of newspaper. Upon ignition of the paper the control product burned up, leaving some char from the ticking.

BURN TEST 2

The product spray coated according to the present invention in Example 1 was subjected to the same test described above in Burn Test 1. The ticking burned away where the flames impinged on the sample. Approximately 1/16 inch layer of char was formed on the outer surface of the coating, and approximately a 1/16 inch layer of discolored foam which was initially gummy formed under the char layer. For this ignition source, the added fire-retardant layer was thicker than necessary to protect the flammable urethane center.

What is claimed is:

1. An article having increased fire-retardant properties comprising a foraminous core structure and an adherent outer protective layer made of a hydrophilic polyurethane foam containing large amount of fire-retardant fillers, wherein the adherence between the core and said polyurethane coating is primarily obtained either
    (a) due to the adhesive nature of said polyurethane as it foams around the foraminous core in combination with the mechanical interlock obtained as said polyurethane foam flows into the foraminous core, or
    (b) due to the mechanical interlock obtained as the core is foamed into the inside foraminous structure of a previously formed outer protective layer of said polyurethane foam.

2. The article according to claim 1, wherein the core is a flexible foam.

3. The article according to claim 2, wherein the core is a polyurethane foam.

4. The article according to claim 1, wherein one of the fillers is a phosphorous fire-retardant compound.

5. The article according to claim 4, wherein the phosphorous compound is ammonium polyphosphate.

6. The article according to claim 1, wherein one of the fillers is alumina trihydrate.

7. The article according to claim 6, wherein the alumina trihydrate has a particle size of about 0.5 to about 120 microns.

8. The article according to claim 6, wherein the alumina hydrate is present in an amount from about 50 to about 400 parts by weight per 100 parts by weight of the polyurethane.

9. The article according to claim 1, wherein one of the fillers is a water-dispersible and combustible char-forming organic carbon compound having from 0.1 to 1.0 hydroxyl group for every carbon atom present in the carbon compound.

10. The article according to claim 9, wherein the carbon compound is starch.

11. The article according to claim 9, wherein the carbon compound is wood cellulose.

12. The article according to claim 1, wherein one of the fillers is a reinforcing fiber.

13. The article according to claim 12, wherein the reinforcing fiber is a fiber selected from the group consisting of glass fibers, mineral wool, quartz fibers, metallic wire, boron fibers, wood fibers, carbon fibers, polyolefin fibers, polyester fibers, polyamide fibers, cellulosic fibers, polyvinyl alcohol fibers, polyvinyl chloride fibers, polyvinylidene chloride fibers and mixtures thereof.

14. The article according to claim 1, wherein the foam is made from a prepolymer which is a mixture of a polyoxyethylene diol and a polyhydric alcohol containing 3 or 4 hyroxyl groups per molecule, said hydroxyl groups of the diol and polyol being reacted with sufficient polyisocyanate to cap all of said hydroxyl groups.

15. The article according to claim 1, wherein the core is a flexible cushioning or bedding product.

16. The article according to claim 15, wherein the core is an innerspring construction.

17. The article of claim 1, wherein the protective layer is bonded to the core.

18. The article of claim 17, further comprising an adhesive layer bonding the protective layer to the core.

* * * * *